(12) United States Patent
Nasu et al.

(10) Patent No.: US 8,197,163 B2
(45) Date of Patent: Jun. 12, 2012

(54) INDEXABLE INSERT AND DRILL USING THE SAME

(75) Inventors: Kazuchika Nasu, Itami (JP); Makoto Abe, Itami (JP); Masaaki Jindai, Itami (JP)

(73) Assignee: Sumitomo Electric Industries, Ltd., Hyogo (JP)

( * ) Notice: Subject to any disclaimer, the term of this patent is extended or adjusted under 35 U.S.C. 154(b) by 1132 days.

(21) Appl. No.: 12/044,529

(22) Filed: Mar. 7, 2008

(65) Prior Publication Data

US 2008/0219791 A1 Sep. 11, 2008

(30) Foreign Application Priority Data

Mar. 7, 2007 (JP) ................. 2007-057038

(51) Int. Cl.
 *B23B 27/16* (2006.01)
 *B23B 51/00* (2006.01)
(52) U.S. Cl. ....................... 408/223; 407/114
(58) Field of Classification Search ............... 407/113, 407/114, 115, 116; 408/223
 See application file for complete search history.

(56) References Cited

U.S. PATENT DOCUMENTS

| | | | |
|---|---|---|---|
| 4,230,429 A | | 10/1980 | Eckle |
| 4,273,480 A | * | 6/1981 | Shirai et al. ........... 407/114 |
| 4,507,024 A | * | 3/1985 | Stashko ................. 407/114 |
| 5,342,151 A | * | 8/1994 | Friedmann ............. 407/116 |
| 5,807,031 A | * | 9/1998 | Arai et al. ............. 407/113 |
| 6,217,264 B1 | * | 4/2001 | Kim et al. .............. 407/114 |
| 6,948,891 B2 | * | 9/2005 | Roman ................... 408/223 |
| 6,979,153 B1 | * | 12/2005 | Shiraiwa ................ 407/107 |

FOREIGN PATENT DOCUMENTS

| | | |
|---|---|---|
| CN | 1203841 A | 1/1999 |
| CN | 1539585 A | 10/2004 |
| EP | 0 800 429 B1 | 5/2001 |
| EP | 1 375 036 A1 | 1/2004 |
| JP | 59-34915 U | 3/1984 |
| JP | 61-21766 B2 | 5/1986 |
| JP | 1086014 A | 4/1998 |
| JP | 2582812 Y2 | 7/1998 |
| JP | 11-277319 A | 10/1999 |
| JP | 2001239412 A | 9/2001 |
| JP | 2002-307221 A | 10/2002 |
| JP | 2003-39228 A | 2/2003 |
| WO | WO 2007/004950 A1 | 1/2007 |

OTHER PUBLICATIONS

Japanese Office Action for corresponding JP Application No. 2007-057038, dated Feb. 2, 2010, pp. 1-4, Japan.
Japanese Office Action for corresponding JP Application No. 2007-057038, Jan. 27, 2009, Japan.
Extended European Search Report for EP Application No. 08003819.-1262, dated Mar. 24, 2010, pp. 1-8.
Chinese Office Action for corresponding CN Application No. 200810007739.X, dated Oct. 11, 2010, pp. 1-11, China.

* cited by examiner

*Primary Examiner* — Daniel Howell
*Assistant Examiner* — Paul M Janeski
(74) *Attorney, Agent, or Firm* — Ditthavong Mori & Steiner, P.C.

(57) ABSTRACT

An indexable insert for a drill includes a chip breaker for disposing chips, provided at an upper face thereof along a cutting edge. The chip breaker has at least one recess. The recess is retracted from an end of the chip breaker near the cutting edge toward the center of the insert by 0.2 mm or greater, or an end of the recess near a center hole of the insert communicates with the center hole.

4 Claims, 6 Drawing Sheets

INDEXABLE INSERT AND DRILL USING THE SAME

BACKGROUND OF THE INVENTION

1. Field of the Invention

The present invention relates to an indexable insert and a drill (indexable drill) in which a plurality of indexable inserts are combined to define cutting edges.

2. Description of the Related Art

Drills used for drilling holes in a metal workpiece include a drill with its cutting edges defined by a plurality of indexable inserts (hereinafter, also merely referred to as inserts). Such a drill is disclosed in the following references and the like.

Japanese Registered Utility Model No. 2582812 discloses an indexable insert for a drill, and a drill with its cutting edges defined by the inserts. In the configuration, a chip breaker is improved to smoothly dispose chips. Also, Japanese Unexamined Patent Application Publication No. 2002-307221 discloses an indexable insert for a drill with all around type breakers having breaker grooves in a rake face entirely along cutting edges. The Publication also discloses an indexable insert additionally having protrusions (protruding portions) in the breaker grooves.

Also, there are suggested an indexable insert (with the all around type breakers) having breaker walls along the cutting edges, instead of the breaker grooves, and an indexable insert having small breaker protrusions separately provided at the rake face. The indexable inserts with the all around type breakers may contain grooves that locally increase chip flow-out resistance to increase chip disposability (parting performance).

In the indexable inserts disclosed in the above-mentioned references and the like, each chip breaker efficiently applies warp to the flow-out chips, thereby efficiently disposing the chips. However, since the contact area of the chips to the surface of the chip breaker is increased, the chip flow-out resistance and the cutting resistance may be increased.

Like problems may appear in the insert with the all around type breakers additionally having the grooves. In this kind of indexable insert, the chip flow-out resistance may be locally increased because of the grooves, and hence, the cutting resistance is further increased.

In the indexable insert having the small protrusions separately provided as the breakers, the chip flow-out resistance and the cutting resistance may be reduced. However, since the chips come into contact with the small protrusions by point contact. Thus, the advantageous effect of the chip breaker may be reduced, and the chip disposability may deteriorate.

SUMMARY OF THE INVENTION

An object of the present invention is to provide an indexable insert for a drill for reducing chip flow-out resistance, so as to provide efficient chip disposability and to reduce cutting resistance.

To attain the above object, the invention made improvements in a polygonal-shaped, indexable insert for a drill, having chip breakers provided at an upper face along cutting edges. At least one recess is provided at each chip breaker, the recess extending from a portion of the chip breaker near the cutting edge toward a center hole of the insert. The recess is retracted from an end of the chip breaker near the cutting edge toward the center of the insert by 0.2 mm or greater, or the recess communicates with (penetrates to) the center hole of the insert.

The chip breaker may be have a breaker groove or may not have a breaker groove.

Preferably, in the indexable insert, the recess may be located in an area distant from an insert edge by 25% to 60% of an insert width, a distance from an end of the recess near the center hole to the center hole may be 0.5 mm or greater, a depth of the recess may be 0.1 mm or greater, or a position of the end of the chip breaker near the cutting edge may be higher than a position of the cutting edge. The expressions, the insert edge and the insert width, will be described later.

The end of the recess near the center hole is retracted from the end of the chip breaker near the cutting edge by 0.2 mm or greater, however, if the distance from the end near the center hole to the center hole is smaller than 0.5 mm, the end near the center hole may penetrate to the center hole.

A plurality of the indexable inserts thus configured are combined to define cutting edges, to constitute a drill. The drill has at a tip thereof a plurality of installation points, and the indexable inserts are detachably attached to the installation points with different installation distances to the drill center. The indexable inserts share a cutting area extending from the drill center to the periphery of the drill to perform cutting. The invention also provides the drill.

The indexable insert of the invention has the recess at a longitudinally intermediate portion of the chip breaker provided along the cutting edge. A clearance is provided between chips and the insert at a portion with the recess. The clearance can reduce the contact area of the chips to the cutting edge. Accordingly, the chip flow-out resistance and the cutting resistance can be reduced.

Also, the chip breaker is continuously arranged along the cutting edge. Accordingly, the contact area of the chips to a breaker wall face is not excessively reduced unlike when the small breaker protrusions are employed. Thus, the chip disposability does not deteriorate.

With this insert, the retracted distance of the end of the recess near the center hole, from the end of the chip breaker near the cutting edge to the center of the insert is 0.2 mm or greater, or the recess penetrates to the center hole. Hence, the chips can be prevented from coming into contact with the bottom of the recess and the end thereof near the center hole. The recess can reliably provide its advantageous effect.

Actions and advantageous effects of other preferred configurations will be apparent in the following description.

DESCRIPTION OF THE PREFERRED EMBODIMENTS

Figure 5:
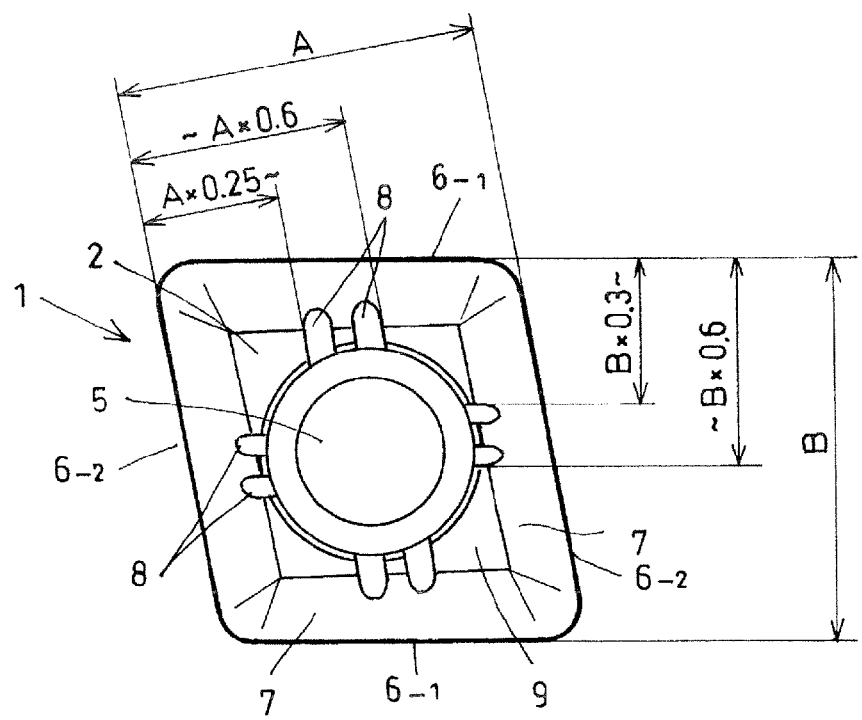
FIG. 5 is a plan view showing an indexable insert according to a second embodiment of the invention.
Figure 6:
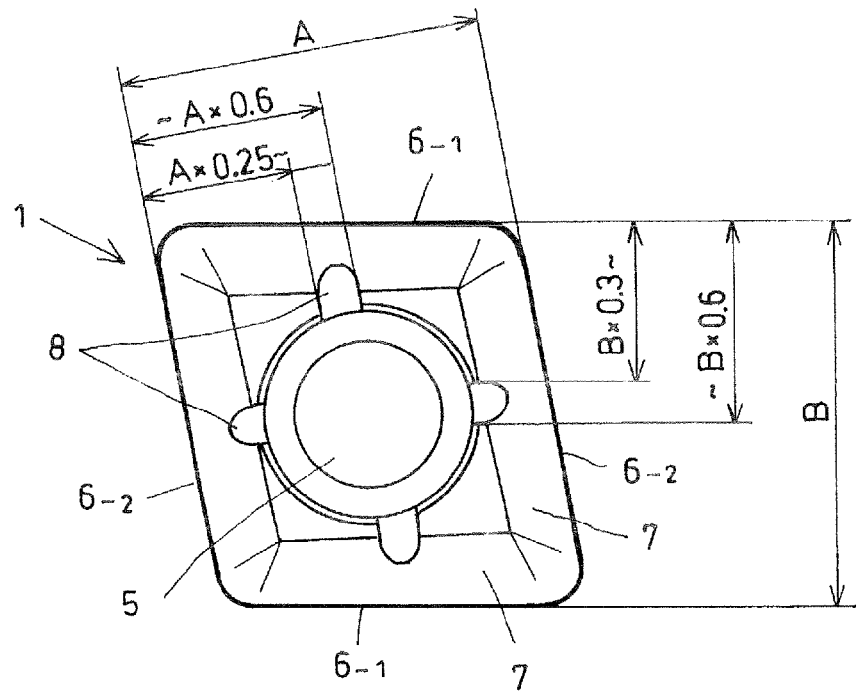
FIG. 6 is a plan view showing an indexable insert according to a third embodiment of the invention.

Embodiments of the invention are described with reference to the attached drawings, FIGS. 1 to 13. FIGS. 1 to 4 show an indexable insert according to a first embodiment of the invention, FIG. 5 shows a second embodiment, and FIG. 6 shows a third embodiment. Any of the exemplary indexable inserts 1 is a positive insert having a parallelogram shape in plan view. Cutting edges 6 are defined by four ridges where the upper face 2, that is, the four sides at the periphery of an upper face 2, intersect with flanks 3 and 4 at an acute angle (see FIGS. 2 and 3). The cutting edges 6 contain two pairs of cutting edges, each pair being arranged parallel to each other. One pair of cutting edges $6_{-1}$ (suffix is applied to discriminate between the two kinds of cutting edges) serve as peripheral cutting edges of a drill. The other pair of cutting edges $6_{-2}$ serve as center cutting edges of the drill. The indexable insert 1 should preferably have the two cutting edges $6_{-1}$ serving as the peripheral cutting edges and the two cutting edges $6_{-2}$ serving as the center cutting edges of the drill to balance the kinds of the inserts 1. However, the shape of the insert 1 does not have to be a parallelogram, and may be a polygon.

The indexable insert 1 has a center hole 5 for its attachment. A chip breaker 7 is continuously arranged at the upper face 2 to longitudinally extend along the entire cutting edge 6. A recess 8 is provided respectively at a longitudinally intermediate portion of the chip breaker 7. A flat land 9 is formed by bulging a part of the upper face 2.

Figure 2:
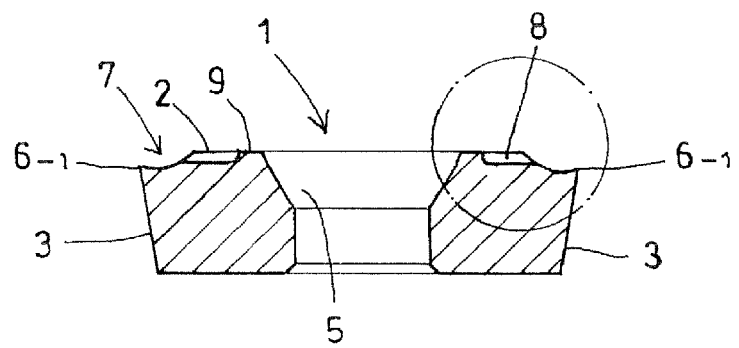
FIG. 2 is an enlarged sectional view taken along line Y-Y in FIG. 1.
Figure 3:
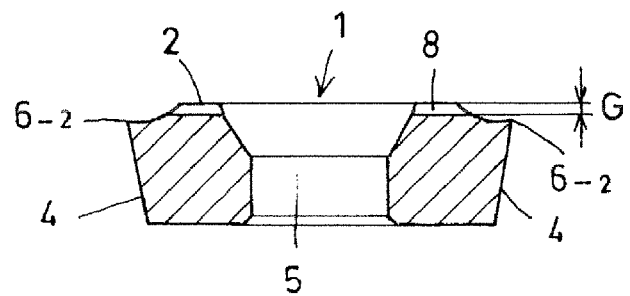
FIG. 3 is an enlarged sectional view taken along line Z-Z in FIG. 1.
Figure 4:
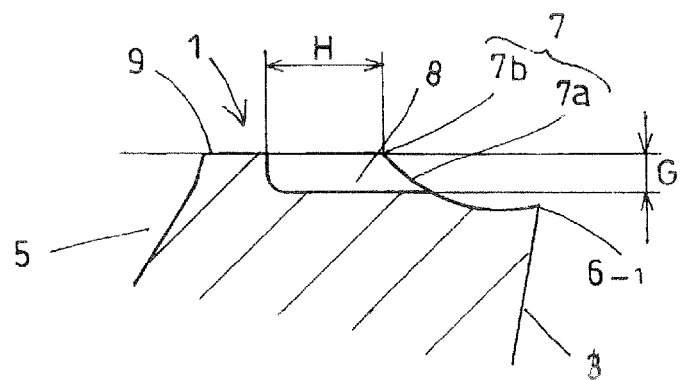
FIG. 4 is a further enlarged sectional view showing a part of FIG. 2.

The illustrated chip breaker 7 is a combination of a breaker wall 7a curved upward to a position higher than the position of the cutting edge 6, and a breaker groove in which the rake face (upper face 2) near the cutting edge 6 is curved downward so that the groove is partially located lower than the position of the cutting edge 6. The chip breaker 7 has a width W ranging from 0.5 to 2.0 mm as in examples. However, the width W is not limited thereto, and a proper value may be selected in accordance with the cutting conditions and the material of a workpiece. As shown in FIGS. 2 and 3, an end 7b of the chip breaker 7 near the cutting edge 6 may be located at a position higher than the position of the cutting edge 6. Hence, chips likely collide with the chip breaker 7, providing efficient chip disposability.

Figure 7:
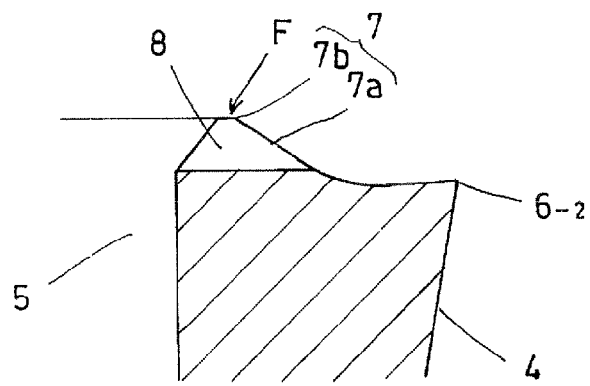
FIG. 7 is an enlarged sectional view of a primary portion showing an exemplary structure in which a recess penetrates to a center hole.

The recess 8 has a retracted distance H of 0.2 mm or greater, from the end 7b near the cutting edge 6 to the center of the insert 1. If a distance D shown in FIG. 1 from the end 7b of the chip breaker 7 near the cutting edge 6 to the center hole 5 is 0.2 mm or smaller, the retracted distance H cannot satisfy the condition. Thus, as shown in FIG. 7, the recess 8 penetrates to the center hole 5. Also, if a distance (distance E in FIG. 1) from an end of the recess 8 near the center hole 5 to the center hole 5 is 0.5 mm or smaller, it is difficult to keep the strength of a portion (portion F in FIG. 7) of the land 9 extending between the recess 8 and the center hole 5. The portion may easily crack during usage or manufacturing of the insert 1. To avoid this, the recess 8 may penetrate to the center hole 5. If the recess 8 is retracted from the end 7b of the chip breaker 7 near the cutting edge 6 to the center of the insert 1 by 0.2 mm or greater, chips are discharged without coming into contact with the bottom of the recess 8 and the end thereof near the center hole 5. Thus, the chip flow-out resistance can be efficiently reduced.

Figure 1:
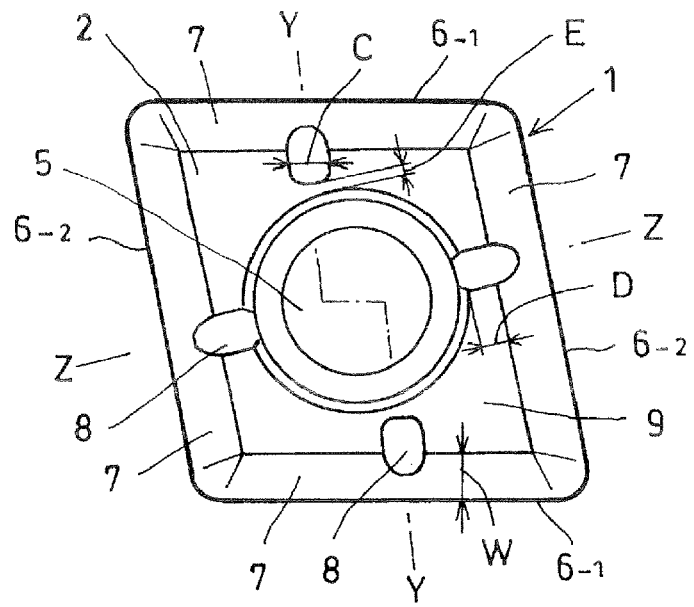
FIG. 1 is a plan view showing an indexable insert according to a first embodiment of the invention.

The recesses 8 may be composed of only those not reaching the center hole 5, or only those penetrating to the center hole 5. Alternatively, as shown in FIG. 1, the recesses 8 may be composed of those not reaching the center hole 5, and those penetrating to the center hole 5. Still alternatively, as shown in FIG. 5, a plurality of recesses 8 may be provided at positions with a proper interval along each cutting edge 6.

The recess 8 may be arranged in an area distant from an insert edge by 25% to 60% of an insert width. For the part used as the peripheral cutting edge of the drill, as shown in FIGS. 5 and 6, it is assumed that the insert width mentioned above is an inert width A defined by a dimension between the cutting edges $6_{-2}$, and the insert edge is an edge of the part substantially serving as the peripheral cutting edge during the usage of the insert 1. For the part used as the center cutting edge of the drill, it is assumed that the insert width mentioned above is an inert width B defined by a dimension between the cutting edges $6_{-1}$, and the insert edge is an edge of the part substantially serving as the center cutting edge during the usage of the insert 1. As long as the conditions are satisfied, both ends of a chip in a width direction reliably come into contact with the wall face of the chip breaker 7, and hence, the chip can be discharged. The chip disposability does not deteriorate even when the recess 8 is provided.

Though described later, the exemplary insert 1 uses one of adjacent sides (cutting edges) as the peripheral cutting edge of the drill, and uses the other as the center cutting edge. The overlap amount between the locus of the peripheral cutting edge and that of the center cutting edge is varied to accommodate variation in the diameter of the drill. To prevent the chip disposability from deteriorating through the variation, the recess 8 should be preferably arranged at the area distant from the insert edge by 25% to 60% of the insert width.

The recess 8 may have a depth G (see FIGS. 2 and 3) of 0.1 mm or greater. When the depth G is 0.1 mm or greater, a clearance is formed between the bottom of the recess 8 and the chips, the recess can reliably and efficiently reduce the cutting resistance. If the width C of the recess 8 is too large, the chips likely come into contact with the bottom of the recess 8. Hence, a proper value is obtained in accordance with the cutting conditions and the material of a workpiece.

In addition, when the total effective length of the chip breaker 7 for a side is equivalent to 40% or more of the insert width A or B, or when the chip breaker 7 includes a linear breaker wall face having a length of 20% or more (length along the cutting edge 6) of the insert width A or B, the chip disposability required for use under typical cutting conditions can be provided. The typical cutting conditions mentioned here contain a cutting speed ranging from 70 to 400 m/min, and a feed per revolution of 0.05 mm/rev or higher. If the feed per revolution is 0.05 mm or lower, the chips produced may be so thin that the recess 8 may not efficiently reduce the contact area.

Figure 8:
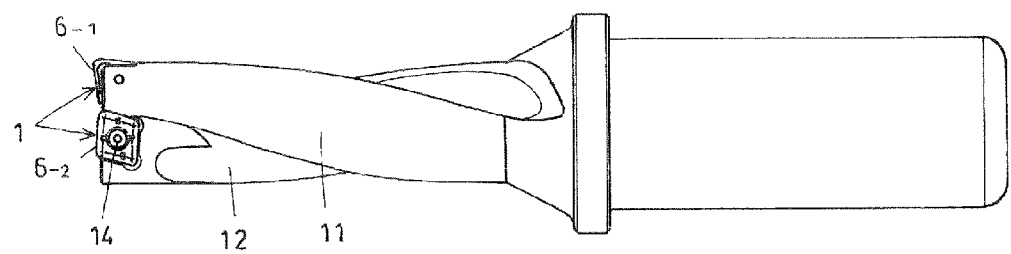
FIG. 8 is a sectional view showing a primary portion of a drill according to an embodiment of the invention.
Figure 9:
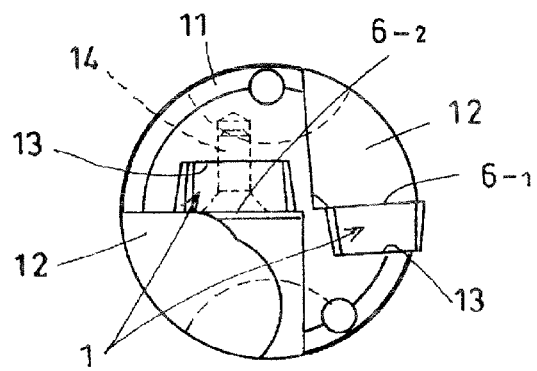
FIG. 9 is a front elevation showing the drill in FIG. 8.

FIGS. 8 and 9 show an exemplary drill of the invention, having the above-described indexable inserts 1 to define the cutting edges 6 thereof. The drill has a drill body 11 with two flutes 12 at its periphery. The drill body 11 has at a tip thereof insert seats 13 at positions rotated by about 180 degrees. The two insert seats 13 are located with different installation distances to the drill center O. The indexable inserts 1 of the invention are detachably attached to the insert seats 13 with clamp screws 14.

Figure 10:
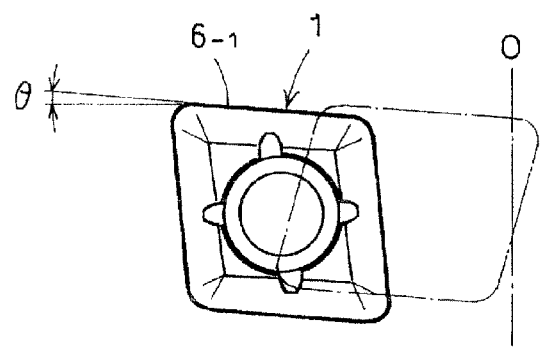
FIG. 10 is a simplified illustration showing the arrangement of a peripheral cutting edge of the drill in FIG. 8.
Figure 11:
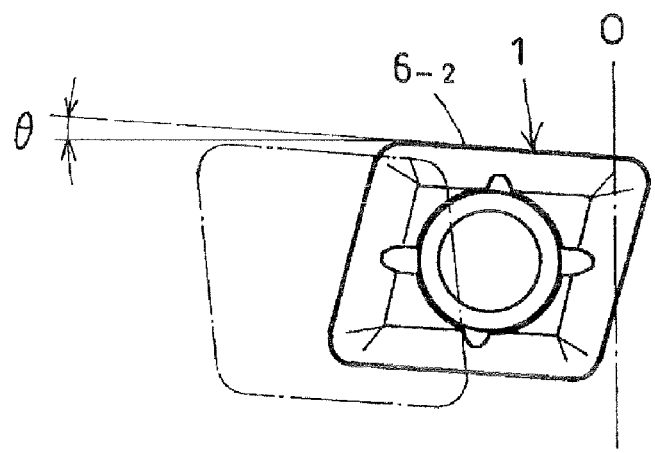
FIG. 11 is a simplified illustration showing the arrangement of a center cutting edge of the drill in FIG. 8.

The two indexable inserts 1 are attached in a manner that the upper faces 2 serve as rake faces. One of the indexable inserts 1 near the periphery of the drill body 11 is arranged such that one of acute corners is located at the outermost periphery and the farthermost edge as shown in FIG. 10. The cutting edge $6_{-1}$ of the insert 1 defines the peripheral cutting edge of the drill at an angle θ to a line perpendicular to the axis of the drill. The other of the indexable inserts 1 is arranged such that one of obtuse corners is located near the periphery while one of acute corners is located at a position exceeding the drill center as shown in FIG. 11. The cutting edge $6_{-2}$ sloping in the same direction as the peripheral cutting edge of the insert 1 defines the center cutting edge of the drill.

Figure 12:
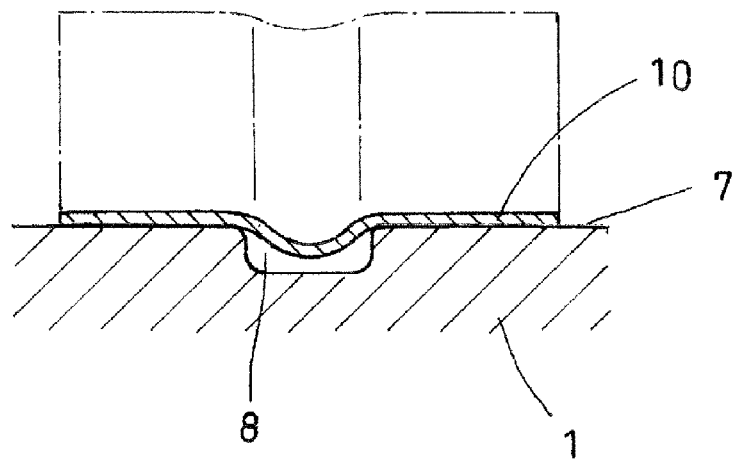
FIG. 12 is a schematic illustration showing the contact state of a chip to the recess.

The peripheral cutting edge of the drill defined by the cutting edge $6_{-1}$ and the center cutting edge of the drill defined by the cutting edge $6_{-2}$ share a cutting area extending from the drill center to the periphery of the drill to perform cutting. Chips produced during cutting enter the recess 8 as shown in FIG. 12. The size of the recess 8 is determined so that a clearance is provided between the bottom of the recess 8 and a chip 10 (the optimum size of the recess 8 may vary in accordance with the cutting conditions and the material of a workpiece), whereby the contact area of the chips to the insert 1 and the cutting resistance can be reduced.

EXAMPLE 1

Figure 13:
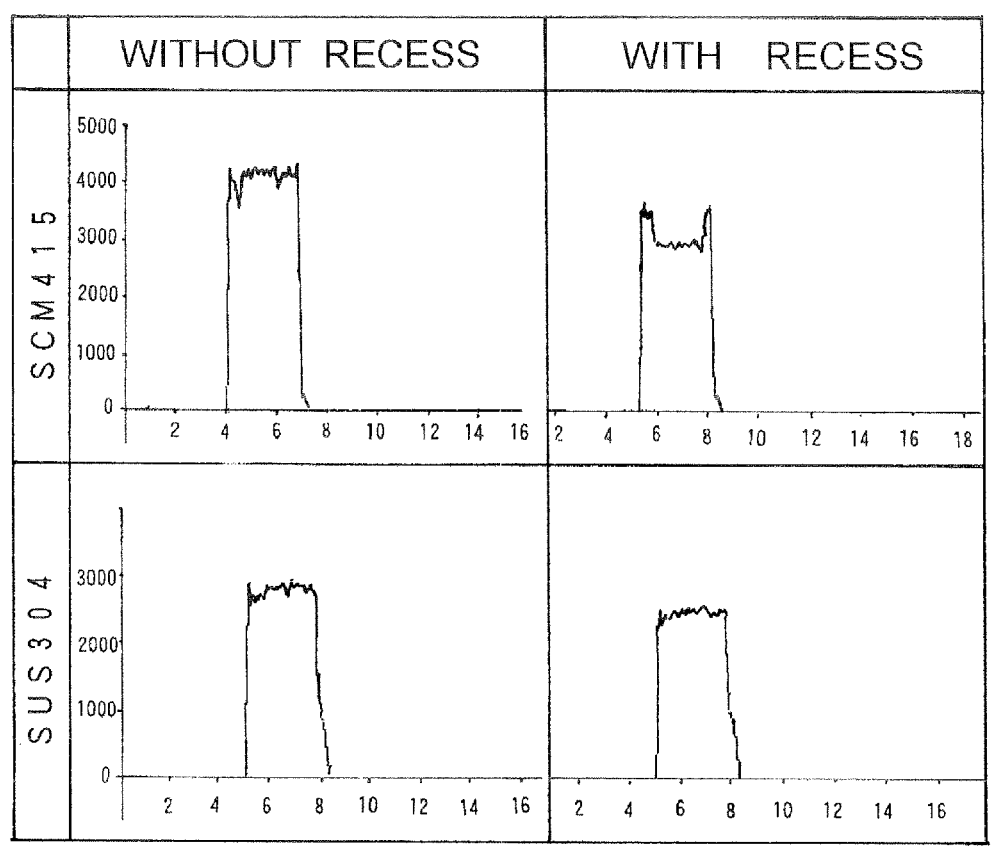
FIG. 13 is a comparative diagram of thrust loads measured through performance evaluation test.

Evaluation test was performed to check the reduction efficiency of the cutting resistance with or without the recess formed in the chip breaker. The test was performed using an insert having the shape of FIG. 1 in which the recess as the feature of the invention was formed at the longitudinally intermediate portion of the chip breaker, and using an insert having a shape similar to FIG. 1, but having no recess. Drills having a diameter of φ20.0 mm with the peripheral cutting edge and the center cutting edge defined by the inserts with the recesses or by the inserts without a recess, were prepared. A workpiece of SCM415 and a workpiece of SUS304 were machined under the conditions at a cutting speed V=175 m/min, and a feed per revolution=0.15 mm/rev, by wet cutting. Then, thrust loads during machining were measured. The measurement results are shown in FIG. 13. As shown in the test result, the drill using the insert having the recess formed in the chip breaker has a smaller thrust load as compared with the drill using the insert without a recess. Thus, the reduction efficiency of the cutting resistance can be found. Note that there were substantially no differences in the shape of the chips and in the breaking state thereof. The influence to the chip disposability because of the recess did not appear.

EXAMPLE 2

Next, a drill having the inserts, in which the recesses were provided at the chip breakers, to define the peripheral cutting edge and the center cutting edge, was prepared. A workpiece of S50C and a workpiece of SS400 were machined with the drill under the same conditions as those of Example 1. In this test, the retracted distance H of the recess 8 shown in FIGS. 2 and 3, from the end 7b of the chip breaker near the cutting edge to the center of the insert, and the depth G of the recess 8 were varied. Then, whether or not the recess 8 could provide the reduction efficiency of the cutting resistance (thrust load) was checked. The result is shown in Tables I and II.

TABLE I

Reduction efficiency of thrust.

| | Retracted distance H (mm) | | | |
|---|---|---|---|---|
| Workpiece | 0.05 | 0.1 | 0.2 | 0.3 |
| S50C | Not found | Found | Found | Found |
| SS400 | Not found | Not found | Found | Found |

TABLE II

Reduction efficiency of thrust.

| | Depth G of recess (mm) | | | |
|---|---|---|---|---|
| Workpiece | 0.05 | 0.1 | 0.2 | 0.3 |
| S50C | Not found | Found | Found | Found |
| SS400 | Not found | Found | Found | Found |

As clarified through the test, if the retracted distance H of the recess 8 from the end of the chip breaker near the cutting edge to the center of the insert was 0.2 mm or smaller, the advantageous effect by the recess was not provided depending on the material of the workpiece. The chips produced had a step portion with a height of about 0.1 mm at maximum at the portion entered the recess. The retracted distance H of the end of the recess 8 near the center hole 5 from the end of the chip breaker near the cutting edge was determined to 0.2 mm, as a dimension that allows the step portion of the chip not to come into contact with the end of the recess 8 near the center hole.

The depth G of the recess 8 may be 0.1 mm or greater according to the same reason, and the test result also supports the value.

What is claimed is:

1. A drill comprising:
    a drill body having at a tip thereof a plurality of installation points; and
    a plurality of the indexable inserts each comprising:
        a plurality of cutting edges provided at an upper face of the indexable insert;
        a chip breaker provided along each of the cutting edges; and
        at least one recess provided at the chip breaker, the recess extending from a portion of the chip breaker near the cutting edge toward a center hole of the insert, wherein the recess is retracted from an end of the chip breaker near the cutting edge toward the center of the insert by 0.2 mm or greater, or the recess communicates with or penetrates to the center hole of the insert, and wherein the recess is located in an area distant from an insert edge used as a peripheral cutting edge or as an inner cutting edge by 25% to 60% of an insert width,
    wherein the indexable inserts are respectively attached to the plurality of installation points with different installation distances to the drill center such that the upper faces with the chip breakers serve as rake faces, and wherein the indexable inserts share a cutting area extending from the drill center to the periphery of the drill to perform cutting.

2. The drill according to claim 1, wherein a distance from an end of the recess near the center hole to the center hole is 0.5 mm or greater.

3. The drill according to claim 1, wherein a depth of the recess is 0.1 mm or greater.

4. The drill according to claim 1, wherein a position of the end of the chip breaker near the cutting edge is higher than a position of the cutting edge.

* * * * *

UNITED STATES PATENT AND TRADEMARK OFFICE
CERTIFICATE OF CORRECTION

PATENT NO.        : 8,197,163 B2
APPLICATION NO.   : 12/044529
DATED             : June 12, 2012
INVENTOR(S)       : Kazuchika Nasu et al.

It is certified that error appears in the above-identified patent and that said Letters Patent is hereby corrected as shown below:

Title page item (73), Assignee: "Sumitomo Electric Industries, Ltd., Hyogo (JP)" should read
--Sumitomo Electric Hardmetal Corp., Hyogo (JP)--.

Signed and Sealed this
Twenty-fifth Day of September, 2012

David J. Kappos
*Director of the United States Patent and Trademark Office*